United States Patent
Maki (10) Patent No.: US 6,470,102 B2
(45) Date of Patent: Oct. 22, 2002

(54) ALL-POLYMER WAVEGUIDE POLARIZATION MODULATOR AND METHOD OF MODE PROFILE CONTROL AND EXCITATION

(75) Inventor: Jeffery J. Maki, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 92 days.

(21) Appl. No.: 09/765,863

(22) Filed: Jan. 18, 2001

(65) Prior Publication Data

US 2001/0030982 A1 Oct. 18, 2001

Related U.S. Application Data (60) Provisional application No. 60/176,850, filed on Jan. 19, 2000.

(51) Int. Cl.[7] .................................................. G02F 1/01
(52) U.S. Cl. .................................. 385/1; 385/11; 385/2; 385/3; 385/8; 385/9; 385/33
(58) Field of Search .......................... 385/11, 14, 1–3, 385/8, 9, 33, 129–132; 359/237, 238, 239, 240, 245, 246

(56) References Cited

U.S. PATENT DOCUMENTS

| | | | |
|---|---|---|---|
| 4,936,645 A | * | 6/1990 | Yoon et al. .................... 385/2 |
| 4,950,884 A | | 8/1990 | Banks ........................ 359/247 |
| 5,946,336 A | | 8/1999 | Mizutani et al. .............. 372/50 |

* cited by examiner

Primary Examiner—Georgia Epps
Assistant Examiner—Tuyen Tra
(74) Attorney, Agent, or Firm—Gray Cary Ware & Freidenrich (57) ABSTRACT

A circular polarization modulator operable to output light alternating in time between left-hand and right-hand circular is provided. The circular polarization modulator preferably comprises three elements: a TE-TM mode-excitation balancer, a TE-TM phase-difference modulator and a TE-TM mode-shape matcher. The TE-TM mode-excitation balancer, which may include a DC voltage source and is preferably based upon a tilt-poled polymer, preferably produces light having as near equally excited TE and TM modes as a forty-five degree (45°) linear input polarization may provide. The TE-TM phase-difference modulator preferably includes an AC voltage source and provides wave retardation capable of producing a phase difference between the TE and TM waves. Upon the light passing through the patterned poling region produced by the first two elements, the unpoled TE-TM mode-shape matcher preferably provides for matching of the TE and TM mode profiles of the light, thereby yielding left-hand and right-hand circular polarized light.

27 Claims, 4 Drawing Sheets

ALL-POLYMER WAVEGUIDE POLARIZATION MODULATOR AND METHOD OF MODE PROFILE CONTROL AND EXCITATION

CROSS REFERENCE TO RELATED APPLICATION

This application claims priority from U.S. Provisional Patent Application Ser. No. 60/176,850, filed Jan. 19, 2000, and entitled "ELECTRO-OPTIC POLYMER CIRCULAR-POLARIZATION MODULATOR."

GOVERNMENTAL RIGHTS

The invention was made with Government support under Contract No. DASG60-98-M-0056 and DASG60-00-C-0007 awarded by the United States Army Space and Missile Defense Command, SMDC-CM-CK. The Government has certain rights in the invention.

TECHNICAL FIELD OF THE INVENTION

The present invention relates generally to modulating light and, more particularly, to a circular polarization modulator which outputs light alternating in time between left-hand and right-hand circular polarization using controllable birefringence.

BACKGROUND OF THE INVENTION

Lasers and other light sources have been used in a variety of systems and devices for many years. For example, light has been used as the basis for imaging, generating signals in optical fibers, increasing the speed of communication systems, enhancing the recognition, detection and classification capabilities of targeting systems as well as enabling other novel devices and systems.

One key aspect to the implementation of light based technology lies in the capabilities of the light source employed. As such, laser devices have been continually modified and refined to perform more precise and reliable functions. To expand the applicability of developed laser technologies, devices such as modulators have been designed and employed.

In this area of laser technology, modulators such as inorganic electro-optic crystal modulators, voltage-induced liquid-crystal reorientation modulators and photoelastic effect based fused-silica plate modulators have been used to expand the applicability of a given laser through polarization modulation. Despite the advantages of these technologies, each has design limitations which prevent broad acceptance. For example, inorganic electro-optic crystal modulators typically require driving voltages in the kilovolt range and use capacitive electrodes which have RC-time-constant limitations. Voltage-induced liquid-crystal reorientation modulators are often bulky, cannot be implemented in an integrated optics application, generally require careful mechanical assembly and are limited to modulation speeds of a few kHz. Photoelastic effect based fused-silica plate modulators, like voltage-induced liquid-crystal reorientation modulators, are generally bulky, have fixed modulation speeds in the range of 20–100 kHz and lack adaptability for integrated optics approaches.

These current laser modulation technologies are also generally incompatible with the ever shrinking electronic components being fabricated today. Without the ability to integrate laser modulation technology into smaller devices, laser technology may become obsolete for many current needs. Existing uses of laser technology as well as such uses as polarimetry of materials, polarization sensitive imaging and high speed polarization scrambling of signals in optical fibers will likely be forced to seek alternatives in order to avoid the limitations of current laser modulation implementations.

SUMMARY OF THE INVENTION

In accordance with teachings of the present invention, a circular polarization modulator is provided. In one embodiment, the circular polarization modulator includes a waveguide core and a cladding material disposed on a first surface of a substrate. The waveguide core preferably includes first, second and third core regions formed in the cladding material disposed on the first surface of the substrate. The first, second and third core regions may be formed as part of a single uniform waveguide core or as separate, individual components optically coupled with each other to the waveguide core.

To induce a mode-conversion effect in the first waveguide region, a DC voltage source coupled to a first electrode on the first surface of the substrate and to a second electrode on a first surface of the cladding material is preferably included. An AC voltage source may also be coupled to a third electrode on the first surface of the substrate and to a fourth electrode on a first surface of the cladding material such that a wave retardation effect in the second waveguide region is created. The use of patterned electric field poling both in location and orientation including the absence of any poling provides the unique character of the first, second and third waveguide regions. The first waveguide region is tilt poled, the second waveguide region is vertically poled, and the third waveguide region is not poled.

In another embodiment, a circular polarization modulator including a waveguide having at least one electro-optic segment suspended in at least one layer of cladding material on a top surface of a substrate is provided. A DC voltage source preferably coupled to a first electrode on the top surface of the substrate and to a second electrode on the top surface of the cladding material such that a tilt-poled effect is created in a first region of the waveguide is also preferably provided. An AC voltage source coupled to a third electrode on the top surface of the substrate and to a fourth electrode on the top surface of the cladding material such that a wave retardation effect is created in a second region of the waveguide is also preferably provided.

In yet another embodiment, a method for creating circular polarized light by inducing a tilt-poled region in a waveguide, inducing a wave retarding region in the waveguide and transmitting light through the waveguide is provided.

The present invention provides technical advantages of small mass, low power consumption, compact alternative as compared to bulky and expensive polarization modulators such as liquid-crystal and inorganic-crystal polarization modulators.

The present invention provides further technical advantages through elimination of moving parts, use of low voltages and, preferably, a single high-speed voltage source. For some applications, a polarization modulator formed in accordance with teachings of the present invention can polarize or rotate a light signal through one hundred eighty degrees (180°) and back or through a complete three hundred and sixty degree (360°) circle.

Another technical advantage provided by the present invention is the ability to use light sources having wavelengths varying from 700 nanometers (nm) to 1600 nm on a given circular polarization modulator as determined by the specific polymer material used.

The present invention further provides technical advantages associated with operating at frequencies in the GHz range.

A technical benefit of the present invention includes the use of patterned poling which eliminates or substantially reduces the use of lenses or other optical devices to direct light from one waveguide to another.

The use of electro-optic polymer in conjunction with patterned poling eliminates or substantially reduces problems associated with waveguides and polarization modulators formed in part from inorganic-crystals such as lithium niobate or lithium tantalite.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention and its advantages are best understood by referring to FIGS. 1 through 10 of the drawings, like numerals being used for like and corresponding parts of the various drawings.

Figure 1:
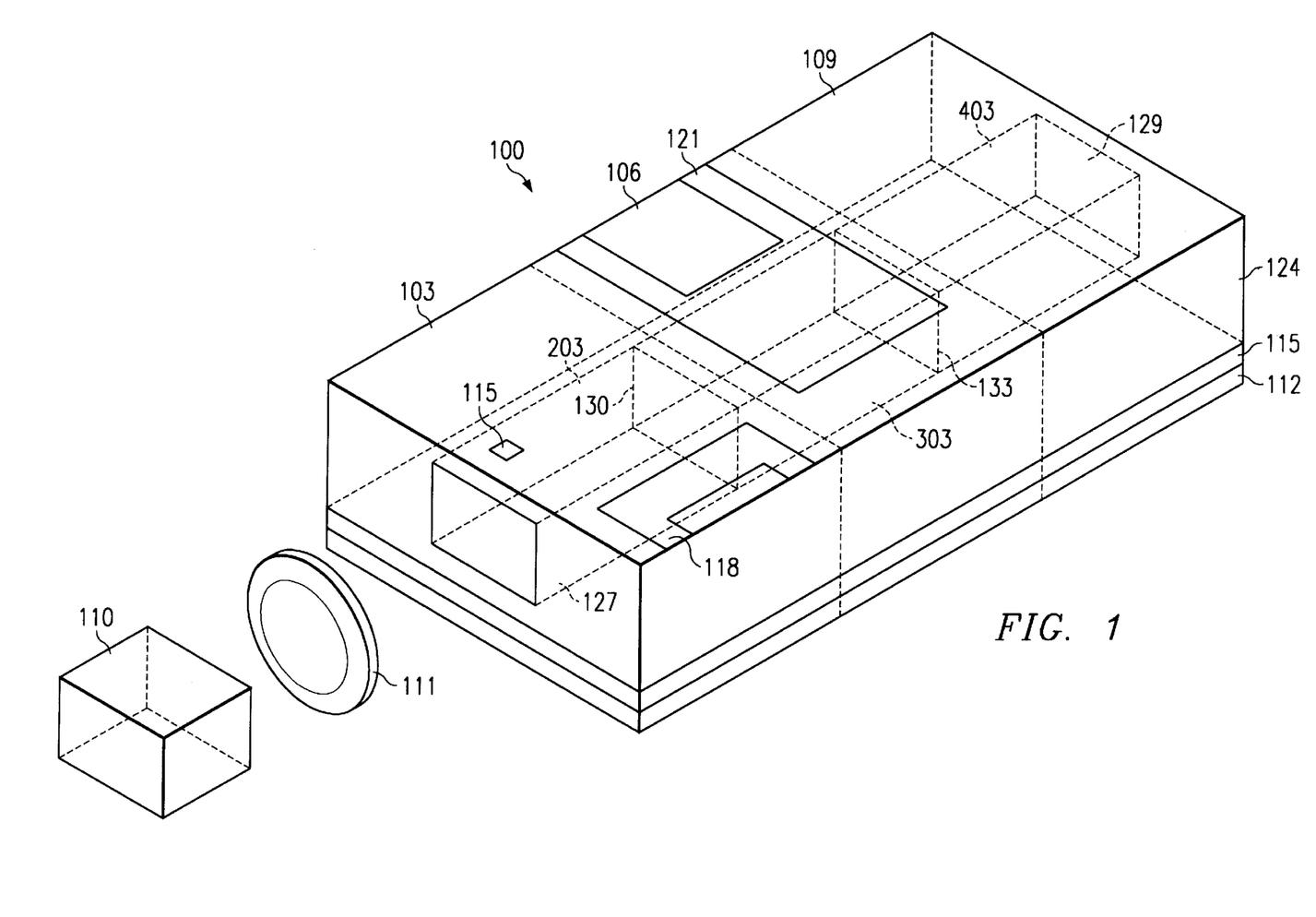
FIG. 1 is a schematic drawing in elevation with portions cut away showing a circular polarization modulator incorporating teachings of the present invention.

FIG. 1 illustrates one embodiment of a circular polarization modulator (CPM) 100 incorporating teachings of the present invention. In general, a light wave has an electric component and a magnetic component disposed transverse to one another as well as to the direction of propagation of the light. CPM 100 is preferably operable to selectively excite and retard the electric and magnetic components of light such that the light emerges from CPM 100 circularly polarized. To accomplish this task, CPM 100 may be constructed from a series of waveguide devices.

As illustrated in FIG. 1, CPM 100 preferably includes Transverse Electric-Transverse Magnetic (TE-TM) mode-excitation balancer 103, TE-TM phase-difference modulator 106 and TE-TM mode-shape matcher 109. In such a construction, CPM 100 may modulate an input light that is linearly polarized, TM light for example, such that the light emerges from CPM 100 circularly polarized.

The linearly polarized input light modulated by CPM 100 may be generated by light source 110. Lens 111 may also be employed between CPM 100 and light source 110 to enable light produced by light source 110 to be focused and/or transmitted into CPM 100 for polarization adjustment and modulation. An additional lens 111 may be positioned proximate output 129 of CPM to enable the resulting polarized light to be transmitted to a desired destination. Light source 110 may take the form of a laser diode, a semiconductor laser, a laser coupled to an optical fiber as well as another appropriate form.

CPM 100 is preferably formed on a substrate 112 such as silicon. CPM 100 preferably also includes electrode 115 disposed on portions of substrate 112 as well as electrodes 118 and 121 disposed on cladding material 124. Suspended in cladding material 124 is waveguide core 127. Waveguide core 127 is preferably single-mode and made from an electro-optic (EO) polymer. As illustrated, waveguide core 127 preferably extends the length of CPM 100. In one embodiment, waveguide core 127 may be formed from a single length of EO polymer extending through waveguide devices 103, 106 and 109. In an alternate embodiment, CPM 100 may also be formed by a series of three waveguide segments or individual components disposed respectively within waveguide devices 103, 106 and 109. For purposes of describing various features of the present invention, waveguide core 127 will be described as having a first, second, and third region.

Although other materials may be satisfactorily used an electro-optical (EO) polymer such as a crosslinked or guest-hot polymer system containing chromophores that are readily poled by application of an electric field are preferably used to form waveguides core 127. The chromophore should preferably exhibit a second-order optical nonlinearity that leads to the electro-optic effect upon the preparation of the polymer material by electric-field poling. In one embodiment of the present invention, Norland Optical Adhesive 61 (NOA-61) may be used as cladding material 124. Other waveguide cladding materials such as varieties of Teflon AF, combinations of silicon dioxide and gallium oxide ($SiO_2$ & $GaO_2$), as well as others may be employed without departing from the spirit and scope of the present invention.

Figure 2:
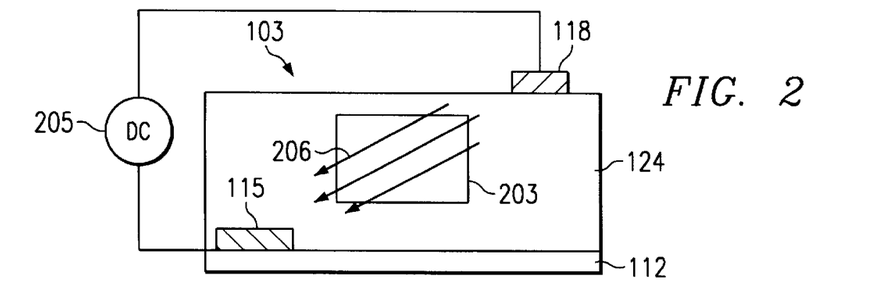
FIG. 2 is a schematic drawing partially in section and partially in elevation showing an end view of a Transverse Electric-Transverse Magnetic (TE-TM) mode-excitation balancer incorporating teachings of the present invention.

FIG. 2 illustrates an end view of TE-TM mode-excitation balancer 103 according to teachings of the present invention. TE-TM mode-excitation balancer 103 preferably includes cladding material 124 disposed on substrate 112. Preferably maintained in cladding material 124 is waveguide 203. Waveguide 203 forms a portion of waveguide 127 of CPM 100. One or more lenses, such as lens 111, may be employed to collimate or otherwise organize light for transmission into and out of any of the waveguides discussed herein. In the simplest case, butt coupling is sufficient, where inherent to patterned poling is that the distinct waveguides are already butt coupled.

TE-TM mode-excitation balancer 103 is preferably based on a tilt-poled polymer. Tilt-poling may be defined as the process of electric-field poling where the axis of applied electric-field lines are oriented primarily at an angle of 45 degrees (45°) with respect to the surface normal. To enable TE-TM mode-excitation balancer 103 to produce such a tilt-poled effect during fabrication, electrodes 115 and 118 are preferably included and are oriented such that they are disposed about waveguide 203 at approximately forty-five degree (45°) angles away from a normal to substrate 112. DC voltage source 205 may be coupled to electrodes 115 and 118 to provide electric field 206, travelling at an angle of approximately forty-five degree (45°) across waveguide 203. As such, electric field 206 enables TE-TM mode-excitation balancer 103 to have an approximately forty-five degree (45°) tilt-poled electro-optic effect, which enables the mode-excitation balancing effect on light travelling the length of waveguide 203 during operation of the device.

Figure 4:
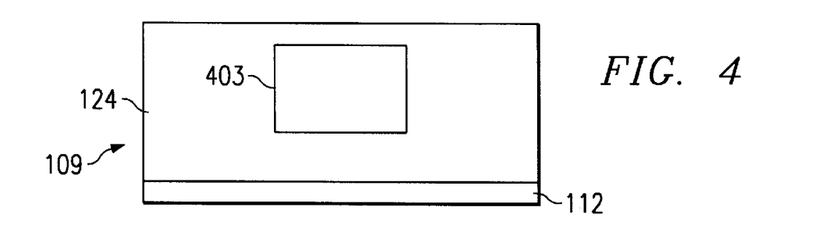
FIG. 4 is a schematic drawing showing an end view of a TE-TM mode-shape matcher according to teachings of the present invention.

TE and TM modes of the light passing through TE-TM mode-excitation balancer 103 are both generally equally excited by a forty-five degree (45°) tilt-poled electro-optic effect. One benefit of the TE-TM mode-excitation balancer 103 is that the excitation of the TE and TM modes can be adjusted to overcome differing confinement and accumulated absorption effects which generally occur when the TE and TM polarization modes enter waveguide 403 of TE-TM mode-shape matcher 109 as shown in FIG. 4.

Figure 3:
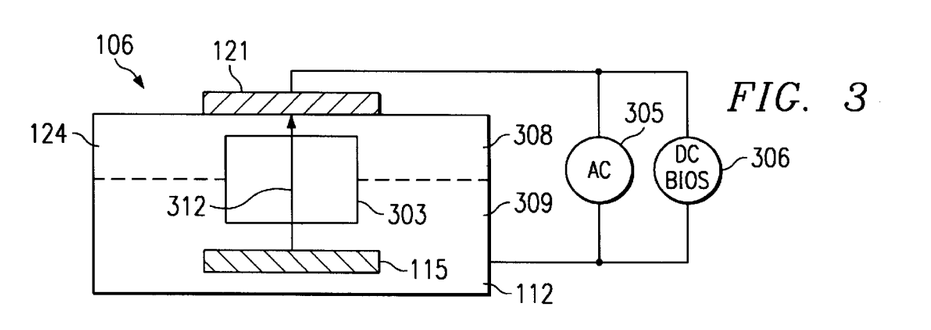
FIG. 3 is a schematic drawing partially in section and partially in elevation showing an end view of a TE-TM phase-difference modulator incorporating teachings of the present invention.

In FIG. 3, an end view of TE-TM phase-difference modulator 106, according to teachings of the present invention, is shown. As mentioned above, to enable CPM 100 to polarize light as desired, only one TE mode and one TM mode are preferably supported by waveguide 303. Waveguide 303 forms another portion of waveguide 127 of CPM 100. In one embodiment, three separate waveguides are fabricated and are butt-coupled to form an effectively single waveguide. In another embodiment, one or more lenses, such as lens 111, may be positioned generally at junction 130 of FIG. 1 to effect the robust transmission of light from waveguide 203 to waveguide 303.

The present invention allows waveguides to be optically coupled by many different mechanisms such as direct butt coupling, coupling by lens, and also coupling by tapered waveguide devices designed just for the process of effectively coupling light from disparate waveguides. The disparity can be from physically different core geometries, but also from use of different materials possessing different indices of refraction. An important feature of the present invention is mitigating problems of mismatch between waveguides owing to polarization dependent indices of refraction.

Waveguide 303 is preferably composed of a polymer with a poling-induced electro-optic (EO) response in one embodiment of the present invention. To provide optical mode isolation between first electrode 115, second electrode 121 and waveguide 303, cladding material 124 is preferably employed. Material that may be used for cladding material 124 includes, but is not limited to, NOA-61.

TE-TM phase-difference modulator 106 preferably provides wave retardation capable of producing a phase difference between the TE and TM waves at the output of CPM 100. For some applications, the phase difference may be approximately one fourth of the associated wavelength. This type of retardation is often referred to as "quarter wave retardation." Quarter wave retardation enables left-hand and right-hand circular polarized light to be produced by CPM 100. To form a modulator and, thus, provide the desired quarter wave retardation, TE-TM phase difference modulator 106 preferably includes time varying or AC voltage source 305 and may also employ DC bias voltage 306. DC bias voltage 306 may be required to null any out static birefringence in CPM 100.

First electrode 115 and second electrode 121 are preferably coupled to AC voltage source 305. First electrode 115 and second electrode 121, with AC voltage source 305 coupled thereto, combine to provide electric field 312 which generally serves to provide the desired electro-optic (EO) response of waveguide 303 mentioned above.

According to one embodiment of the present invention, waveguide 303 of TE-TM phase-difference modulator 106 has an approximate height of 1.2 micrometer and an approximate width of 2.0 micrometer. Upper cladding layer 306 and lower cladding layer 309 of such an embodiment preferably have a thickness of approximately 2.4 micrometer The index of refraction for cladding material 124, when NOA-61 is employed, is approximately 1.54 at a thickness of about 1.3 micrometer. The unpoled index of refraction for waveguide 303 when using LD-3 is approximately 1.6 at a thickness of about 1.3 micrometer. Approximate index of refraction values of 1.553609 for TE modes and 1.573033 for TM modes have been determined to exist. However, poling-induced birefringence for poled LD-3 may produce lower values.

In FIG. 4, one embodiment of TE-TM mode-shape matcher 109 incorporating teachings of the present invention is shown. Waveguide 403 of TE-TM mode-shape matcher 109 is preferably made from an electro-optic polymer similar to that used in waveguide 303 of TE-TM phase-difference modulator 106 and waveguide 203 of TE-TM mode-excitation balancer 103. In one embodiment of CPM 100, waveguide 403 forms the final portion of waveguide 127. One or more lenses, such as lens 111, may be used at junction 133 of FIG. 1 to couple waveguide 403 to waveguides 203 and 303 and such that waveguides 203, 303 and 403 thereby collectively form waveguide 127.

Preferably surrounding waveguide 403 is cladding material 124. As with TE-TM phase-difference modulator 106 and TE-TM mode-excitation balancer 103, TE-TM mode-shape matcher 109 is preferably formed on substrate 112. Various types of materials such as silicon may be used to form substrate 112.

As mentioned above, TE-TM mode-shape matcher 109 is preferably fabricated from an electro-optic polymer and other materials similar to those used to fabricate TE-TM mode-excitation balancer 103 and TE-TM phase-difference modulator 106. However, TE-TM mode-shape matcher 109 is preferably not poled. Poling-induced birefringence in TE-TM mode-shape matcher 109 may degrade the quality of the output polarization owing to the differing confinements of the TE and TM modes when located therein. Accordingly, TE-TM mode-shape matcher 109 preferably provides for the matching of field profiles between TE and TM modes.

In one embodiment of TE-TM mode-shape matcher 109, waveguide 403 has a refractive index value of approximately 1.6. Predicted indices of refraction for TE and TM modes are approximately 1.559844 and 1.559316 respectively. The small difference between these values may be attributed to the rectangular geometry of waveguide 403, where a square geometry should be considered to be included in general terms.

The design of TE-TM mode-excitation balancer 103 is based on a TE-TM mode-converter. Research (i.e., numerical simulations) on an EO-polymer TE-TM mode-converter has identified that 100% conversion efficiency may be difficult to achieve. For CPM 100 however, TE-TM mode-excitation balancer 103 need only produce approximately 50% mode conversion to approximately equally excite the TE and TM components or modes of a lightwave communicated through waveguide 203. Similarly, TE-TM mode-excitation balancer 103 need only excite the respective TE and TM modes just different enough to compensate for differing confinements and losses incurred when the two modes enter TE-TM mode-shape matcher 109.

TE-TM mode-excitation balancer 103 operates on the premise that neither the TE mode nor the TM mode is an eigenmode, that is invariant with propagation in amplitude and Cartesian-coordinate orientation of electric or magnetic vectors as is applicable, when the polymer or waveguide 203 is poled with a tilted poling axis. When received into waveguide 203 using titled poling, light that is initially TE or TM polarized generally does not remain in this polarization state. The light may periodically change between being predominately TE or TM polarized; hence, the modes are coupled. By making use of the electro-optic effect, the spatial period of this exchange may be modified such that the polarization state at the output of TE-TM mode-excitation balancer 103 may be adjusted somewhere between the states of predominantly TE or TM polarized. Use of this adjustment capability is discussed in greater detail below.

The essential behavior of TE-TM mode-excitation balancer 103 may be analyzed using coupled-mode theory. This analysis may be simplified by having waveguide 203 support only a single TM mode and a single TE mode when poled in a conventional manner (i.e., vertically or horizontally). As such, the TM and TE modes will no longer be eigenmodes of waveguide 203 when tilt-poled. Coupled-mode theory, however, does rely upon using the TM and TE modes as the basic functions for describing a tilt-poled waveguide. The amount of poling-induced birefringence generally does not cause additional spatial modes to be supported by waveguide 203. The mode profiles for the TM and TE components as $E_a(x,y)$ and $E_b(x,y)$, respectively. The propagation constants for the TM and TE waves are $\beta_a$ and $\beta_b$, respectively. Thus, the electric field propagating in tilt-poled waveguide 203 may be defined as $$E = [A_a(z)E_a(x,y)\hat{x} + A_b(z)E_b(x,y)\hat{y}]e^{i(\omega t - \bar{\beta} z)}, \quad (1)$$

where the electric-field amplitudes are $$A_a(z) = \left[\cos\left(\frac{\pi}{\Lambda}z\right) - \frac{i\delta\Lambda}{\pi}\sin\left(\frac{\pi}{\Lambda}z\right)\right]A_a(0) - \frac{i\kappa\Lambda}{\pi}\sin\left(\frac{\pi}{\Lambda}z\right)A_b(0),$$

$$A_a(z) = -\frac{i\kappa\Lambda}{\pi}\sin\left(\frac{\pi}{\Lambda}z\right)A_a(0) + \left[\cos\left(\frac{\pi}{\Lambda}z\right) + \frac{i\delta\Lambda}{\pi}\sin\left(\frac{\pi}{\Lambda}z\right)\right]A_b(0) \quad (2)$$

and the parameters are $$\delta = \frac{(\beta_a + \kappa_{aa}) - (\beta_b + \kappa_{bb})}{2}, \quad (3a)$$

$$\bar{\beta} = \frac{(\beta_a + \kappa_{aa}) + (\beta_b + \kappa_{bb})}{2}, \quad (3b)$$

$$\kappa = \kappa_{ab} = \kappa_{ba}^*, \quad (3c)$$

$$\Lambda = \frac{\pi}{\sqrt{\kappa^2 + \delta^2}}. \quad (3d)$$

The coupling coefficients $\kappa_{aa}$, $\kappa_{bb}$, and $\kappa = \kappa_{ab} = \kappa^*_{ba}$ will be defined later when required. The quantity $\Lambda$ is the spatial coupling period, which may figure significantly into the design of TE-TM mode-excitation balancer 103. The intensity in the x and y directions may be described as being respectively the TM and TE polarizations even though the TM and TE modes are no longer eigenmodes of the waveguide. In arbitrary units, these intensity components may be defined as $$I_{TM}(z) = |A_a(z)|^2 \quad (4)$$
$$I_{TE}(z) = |A_b(z)|^2.$$

For $\delta = 0$, Eq. (2) reduces to $$A_a(z) = A_a(0)\cos \kappa z - iA_b(0)\sin \kappa z$$

$$A_b(z) = -iA_a(0)\sin \kappa z + A_b(0)\cos \kappa z' \quad (5)$$

Under the condition that $\delta = 0$, the variation of $\delta$ with applied voltage via the electro-optic effect is also negligible because the terms in Eq. (3a) cancel each other. For waveguides with a generally square cross section, a should have a distribution centered around forty-five degrees (45°). Thus, the coupling constant $\kappa$ may be defined as $$\kappa = \frac{\omega \varepsilon_o}{4}\int\int \sin\alpha\cos\alpha(n_1^2 - n_2^2)E_x^* E_y dx dy = \quad (6)$$

$$\frac{\omega \varepsilon_o}{8}(n_1^2 - n_2^2)\int\int E_x^* E_y dx dy$$

Using a waveguide that is symmetric gives $$\kappa \cong \frac{\pi}{2\lambda n}(n_1^2 - n_2^2). \quad (7)$$

The change in the coupling coefficient $\kappa$ owing to the electro-optic effect may be defined as $$\Delta \kappa \cong \frac{\pi}{2\lambda n}(\Delta n_1 - \Delta n_2) \cong -\frac{\pi}{3\lambda}n^3 r_{33}\frac{V}{d_{eff}}, \quad (8)$$

where we have used the fact that $r_{33} \approx 3r_{13}$, $$\Delta n_1 = -\frac{1}{2}n^3 r_{33}\frac{V}{d_{\it eff}}, \text{ and } \Delta n_2 = -\frac{1}{2}n^3 r_{13}\frac{V}{d_{\it eff}} \text{ has been used.}$$

Figure 5:
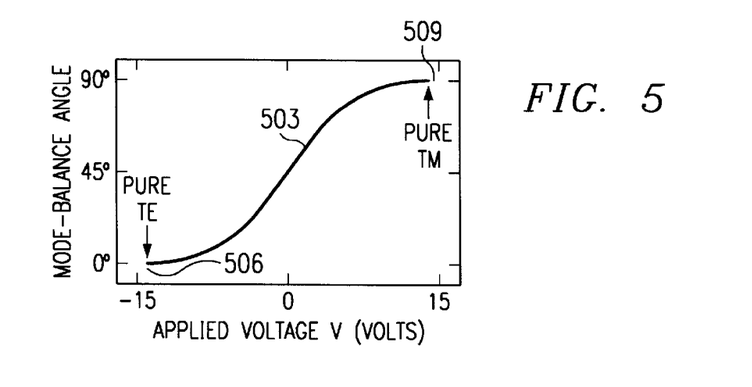
FIG. 5 illustrates a graph depicting the mode-balance angle of forty-five degrees (45°) linearly polarized input light passed through the TE-TM excitation balancer of FIG. 2 according to teachings of the present invention.

The behavior of TE-TM mode-excitation balancer 103 illustrated in FIG. 2 may be summarized by plotting mode-balance angle $\tan^{-1}(I_{TM}/I_{TE})$ at the output of TE-TM mode-excitation balancer 103 using Eqs. (4) for the TE and TM intensities, where the amplitudes are given by Eqs. (2). Recall that the input polarization is TM. Equation (3d), with κ given by Eq. (7) and δ=0, gives Δ=217 micrometer for n=1.6, $n_1$=1.604, $n_2$=1.598, and λ=1.3 micrometer. Hence, the physical length over which the intensity exchanges between TE and TM is short. The electro-optic effect may also modify coupling period λ. An appropriate electrode structure is preferably in place to drive the electro-optic effect. Equation (8) gives the modification to the coupling coefficient with applied voltage. We take $r_{33}$=10 pm per V, $d_{\it eff}$=6 micrometer, and L=1 cm. In FIG. 5, the mode-balance angle $\tan^{-1}(I_{TM}/I_{TE})$ as a function of the applied voltage is plotted. As indicated at 503, for zero applied voltage, the output is split approximately 50/50 between TE and TM modes. As the voltage is varied, the output polarization may be selectable from pure TE 506 to pure TM 509.

Figure 6A:
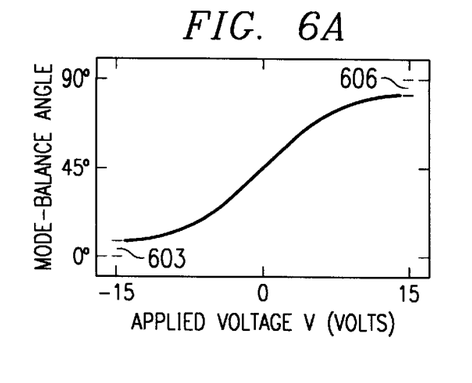
FIG. 6A illustrates a graph depicting the mode-balance angle of a 20° linearly polarized input light passed through TE-TM excitation balancer of FIG. 2 according to teachings of the present invention.
Figure 6B:
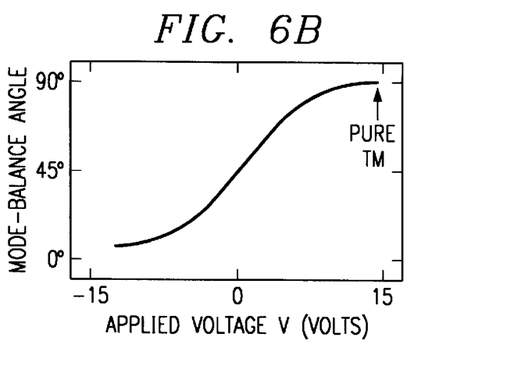
FIG. 6B illustrates a graph depicting the mode-balance angle of a 35° linearly polarized input light passed through TE-TM excitation balancer of FIG. 2 according to teachings of the present invention.

As illustrated in FIGS. 6A and 6B, misalignment of the input polarization may influence TE-TM mode conversion. This may happen during packaging if, for example, a diode laser light source (not expressly shown) is rotated such that its linear output polarization is not precisely TE or TM. FIG. 6A shows what may happen if such a misalignment were twenty degrees (20°). As illustrated, complete mode conversion may no longer be possible. In addition, notice that the degradation of conversion to either purely TE or TM polarization is generally symmetric as indicated at 603 and 606 respectively.

Design of CPM 100 preferably has a fabrication tolerance within the limits of present technology. Requiring that δ=0 for optimal performance, some idea of how much fabrication error may affect δ, and hence the device performance may be obtained. In the ideal case, a nearly uniform poling electric-field distribution in the waveguide region with an average tilt angle of forty-five degrees (45°), as illustrated in FIG. 2, preferably exists. In addition, the waveguide preferably has low modal birefringence and the non-linear optical polymer is preferably isotropic before poling, so that we have $\beta_a = \beta_b$, and $\kappa_{aa} = \kappa_{bb}$. In this preferred embodiment, Eq. (3a) gives δ=0. In the non-ideal case, however, there may be a misalignment of the poling electrodes, then $\kappa_{aa} \neq \kappa_{bb}$. For this case of misalignment $$\delta = \frac{\pi}{2\lambda n}(n_1^2 - n_2^2)\cos 2\alpha = \kappa \cos 2\alpha. \quad (9)$$

Plotted in the graph of FIG. 6B is the case where α=35° instead of the preferred forty-five degrees (45°). The output polarizations reachable are asymmetric. The original input polarization, TM here, may be obtained but the orthogonal polarization may not.

A variety of issues that affect the design of TE-TM mode-excitation balancer 103 have been analyzed. The results show that while it may be difficult to use a tilt-poled waveguide as a TE-TM mode converter, since the states of pure TE and TM polarization are difficult to obtain at the output, the intermediate goal of selecting a balance between TE and TM excitation may be possible. Thus, forming TE-TM mode-excitation balancer 103 may be a feasible application of tilted poling.

As mentioned above, TE-TM phase-difference modulator 106 may be designed from an EO polymer that supports one TE mode and one TM mode. Coupling an AC voltage source and a DC bias where needed to CPM 100 enables TE-TM phase-difference modulator 106 to produce the desired quarter wave retardation which thereby enables the production of left-hand and right-hand generally circular polarized light. In some assemblies, the amplitudes between the left-hand and right-hand polarized light may not match, causing the light to be elliptically polarized instead of purely circularly polarized. The possibility of elliptically polarized light is one reason for the employment of TE-TM mode-shape matcher 109. Propagation of light through TE-TM mode-shape matcher 109 preferably causes the mode profiles to adjust and thus be matched. However, regardless of the use of TE-TM mode-shape matcher 109, the light output from TE-TM phase-difference modulator 106 can be made quarter-wave in retardation between the TE and TM modes. This ability may eliminate the need for TE-TM mode-shape matcher 109 in some applications. Certain applications may require the stringent matching capabilities of TE-TM mode-shape matcher 109.

Figure 7A:
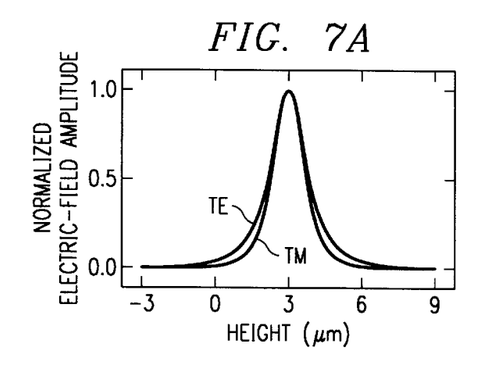
FIG. 7A illustrates a graph depicting the mode profiles of light across the height of TE-TM phase-difference modulator of FIG. 3 according to teachings of the present invention.
Figure 7B:
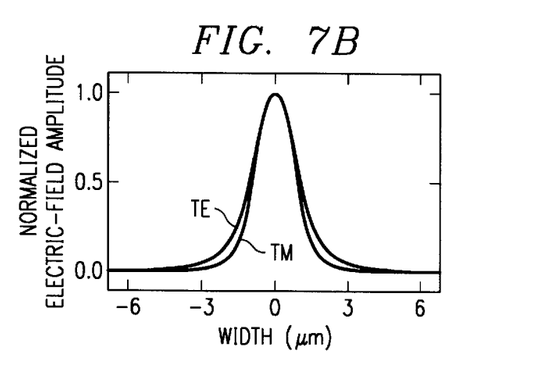
FIG. 7B illustrates a graph depicting the mode profiles of light across the width of TE-TM phase-difference modulator of FIG. 3 according to teachings of the present invention.

Illustrated in FIGS. 7A and 7B are the mode profiles across the height, FIG. 7A, and width, FIG. 7B, of waveguide 303 of TE-TM phase-difference modulator 106. Note that, as depicted, the core of waveguide 303 is centered around a height of 3 micrometer and a width of 0 micrometer. Also as illustrated, the TM polarized light is more confined than the TE polarized light and the mode profiles generally match at the center but not outside of the core.

Figure 8A:
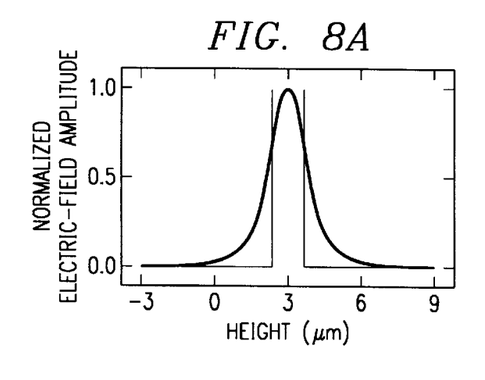
FIG. 8A illustrates a graph depicting the mode profiles of light across the height of TE-TM phase-difference modulator of FIG. 3 at the output according to teachings of the present invention.
Figure 8B:
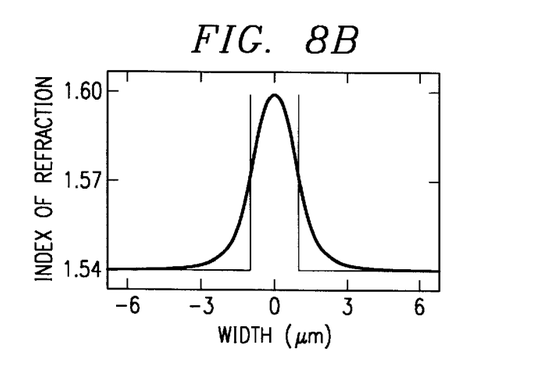
FIG. 8B illustrates a graph depicting the mode profiles of light across the width of TE-TM phase-difference modulator of FIG. 3 at the output according to teachings of the present invention.

The peak intensity of light in TE-TM phase-difference modulator 106 is preferably approximately equal for TE and TM modes. As the TE and TM modes of light enter into waveguide 403 of TE-TM mode-shape matcher 109, the TE and TM modes preferably become approximately equally confined as illustrated in FIGS. 8A and 8B. The TE and TM modes have been plotted together in the graphs of FIGS. 8A and 8B, however, a difference between the two modes is not discernable. Also indicated in the graphs of FIGS. 8A and 8B is the fact that most of the light intensity is preferably in the core of waveguide 403.

The electric-field complex amplitudes produced by TE-TM phase-difference modulator 106 may be expressed as $E_{TE} = (A/\sqrt{2} + \Delta A)$ and $E_{TM} = iA/\sqrt{2}$. The numerical difference in the mode-amplitude profiles is ΔA. The left-hand and right-hand circular extinction ratio may be defined as $$\left|\frac{E_L}{E_R}\right|^2 = \frac{(\Delta A)^2}{(|E_{TM}| + |E_{TE}|)^2} = \frac{(\Delta A)^2}{I_{total}}$$

Figure 9A:
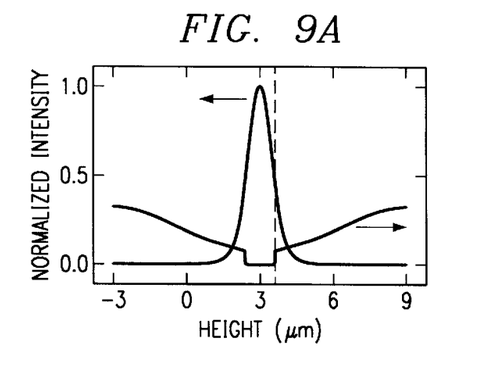
FIG. 9A illustrates a graph depicting the LHC-RHC extinction ratio across the height of the output of TE-TM phase-difference modulator of FIG. 3 according to teachings of the present invention.
Figure 9B:
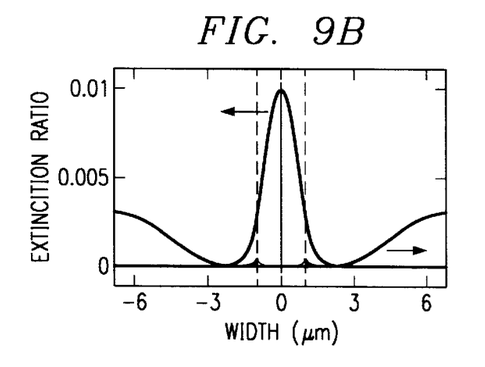
FIG. 9B illustrates a graph depicting the LHC-RHC extinction ratio across the width of the output of TE-TM phase-difference modulator of FIG. 3 according to teachings of the present invention.

When the mode-amplitude profiles exactly match, i.e, when ΔA=0, Eq. 10 gives an extinction ratio of zero. Eq. 10 is plotted in the graphs of FIGS. 9A and 9B using numerical values for ΔA corresponding to the curves of the graphs of FIGS. 8A and 8B. As illustrated in the graphs of FIGS. 9A and 9B, the left-hand circular and right-hand circular extinction is zero at the center of the profiles. Outside of the core of waveguide 403 the extinction may no longer be zero, but the intensity in this region is generally small and inconsequential for certain applications.

Figure 10A:
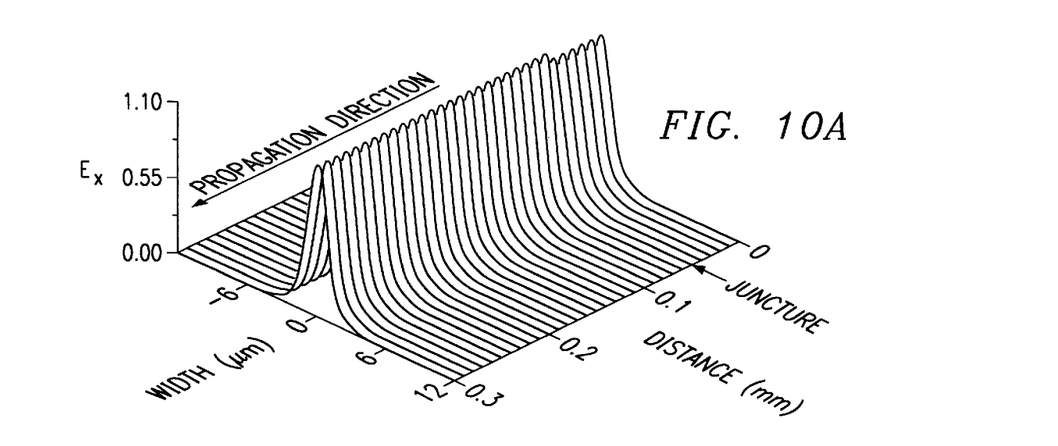
FIG. 10A illustrates a graph depicting the change in confinement for the TE mode of light in TE-TM mode-shape matcher of FIG. 4 according to teachings of the present invention.
Figure 10B:
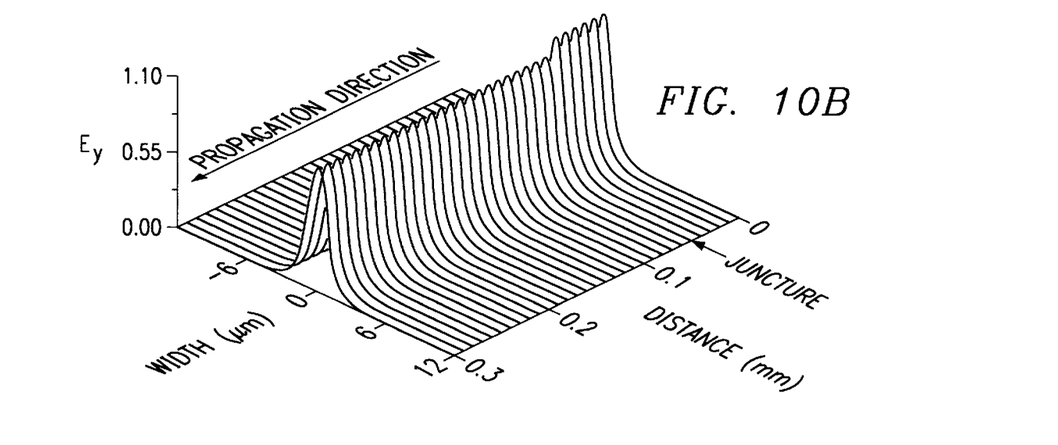
FIG. 10B illustrates a graph depicting the change in confinement for the TM mode of light in TE-TM mode-shape matcher of FIG. 4 according to teachings of the present invention.

As the light propagates from TE-TM phase-difference modulator 106 into TE-TM mode-shape matcher 109, the TE mode light may become more confined and the TM mode light may become less confined. The changes in confinement are depicted in the graph of FIG. 10A for the TE mode and in the graph of FIG. 10B for the TM mode. As a result of this change in confinement, a change in electric field peak values for the TE and TM modes may also be observed. As explained above, adjustments in TE-TM mode-excitation balancer 103 may be used to correct such an imbalance in electric field amplitudes.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. An apparatus for modulating light comprising:

a first waveguide core region disposed in a cladding material;

the cladding material disposed on a first surface of a substrate;

a DC voltage source operably coupled to a first electrode disposed on the substrate and to a second electrode disposed on a first surface of the cladding material such that a mode-conversion effect is created in the first waveguide region;

a second waveguide core region operably coupled to the first waveguide region;

the second waveguide core region disposed in the cladding material; and an AC voltage source operably coupled to a third electrode disposed on the substrate and to a fourth electrode disposed on the first surface of the cladding material such that a wave retardation effect is created in the second waveguide region.

2. The apparatus of claim 1 further comprising:

a third waveguide core region operably coupled to the second waveguide region;

the third waveguide core region disposed in the cladding material; and the third waveguide core region operable to approximately match at least two modes of light passing through the third waveguide region.

3. The apparatus of claim 1 further comprising a DC voltage source operably coupled to the third and fourth electrodes.

4. The apparatus of claim 1 further comprising the waveguide core regions formed from an electro-optic (EO) polymer.

5. The apparatus of claim 1 further comprising the DC voltage source and the first and second electrodes cooperating to create an approximately forty-five degree tilt-poled effect in the first waveguide region during fabrication.

6. The apparatus of claim 1 further comprising the AC voltage source and the third and fourth electrodes cooperating to create an approximately quarter wave retardation effect in the second waveguide region.

7. The apparatus of claim 1 further comprising a laser operably coupled to the first waveguide region.

8. The apparatus of claim 1 further comprising:

a first lens operably coupled to the first waveguide region;

the first lens operable to focus light for transmission into the first waveguide region;

a second lens operably coupled to the second waveguide region; and the second lens operable to focus light for transmission from the second waveguide region.

9. The apparatus of claim 1 further comprising the first waveguide core region and the second waveguide core region cooperating to produce circularly polarized light.

10. The apparatus of claim 1 further comprising the first waveguide core region and the second waveguide core region cooperating to produce arbitrary elliptically polarized light.

11. A circular polarization light modulator comprising:

at least one layer of cladding material disposed on a substrate;

a waveguide having at least one electro-optic segment disposed in the cladding material;

a DC voltage source operably coupled to a first electrode disposed on the substrate and to a second electrode disposed on the cladding material spaced from the substrate;

the first electrode and the second electrode disposed with respect to one another such that current flow from the DC voltage source through the first and second electrodes creates a mode-conversion effect in a first region of the waveguide during fabrication;

an AC voltage source operably coupled to a third electrode disposed on the substrate and to a fourth electrode disposed on the cladding material spaced from the substrate; and the third electrode and the fourth electrode disposed with respect to one another such that current flow from the AC voltage source through the third and fourth electrodes creates a wave retardation effect in a second region of the waveguide.

12. The circular polarization light modulator of claim 11 further comprising approximately quarter wave retardation created in the second region of the waveguide.

13. The circular polarization light modulator of claim 11 further comprising approximately forty-five degree tilt-poling created in the first region of the waveguide.

14. The circular polarization light modulator of claim 11 further comprising a DC bias voltage source operably coupled to the third and fourth electrodes.

15. The circular polarization light modulator of claim 11 further comprising a third region of the waveguide operable to approximately match at least two modes of light passing through the waveguide.

16. The circular polarization light modulator of claim 11 further comprising at least one lens operably coupled between a first electro-optic polymer segment in the first region of the waveguide and a second electro-optic polymer segment in the second region of the waveguide.

17. The circular polarization light modulator of claim 11 further comprising an optical fiber operable to transmit light into the waveguide.

18. The circular polarization light modulator of claim 11 further comprising a laser operable to transmit light into the waveguide.

19. The circular polarization light modulator of claim 11 further comprising:

a first lens operably coupled to a first end of the waveguide;

the first lens operable to collimate light for transmission into the waveguide;

a second lens operably coupled to a second end of the waveguide; and the second lens operable to collimate light from the waveguide for transmission.

20. A method for creating circular polarized light comprising:

producing a tilt-poled region in a waveguide during fabrication;

producing a wave retarding region in the waveguide;

transmitting light through the waveguide; and circularly polarizing the light by the combined effect of the tilt-poled region and the wave retarding region.

21. The method of claim 20 further comprising forming a mode-shape matching region adjacent to the wave retarding region in the waveguide.

22. The method of claim 20 further comprising:

the tilt-poled region providing approximating forty-five degree tilt-poling; and the wave retarding region providing approximating quarter wave retardation.

23. A circular polarization light modulator comprising:

a waveguide defined in part by a waveguide core and a layer of cladding disposed on a substrate;

the waveguide core having a first, second and third region formed from an electro-optic (EO) polymer;

a DC voltage source operably coupled to a first electrode disposed on the substrate and to a second electrode disposed on the cladding spaced from the substrate;

the first electrode and the second electrode disposed with respect to one another such that current flow from the DC voltage source through the first and second electrodes creates a mode-conversion effect in the first region of the waveguide core;

an AC voltage source operably coupled to a third electrode disposed on the substrate and to a fourth electrode disposed on the cladding spaced from the substrate; and the third electrode and the fourth electrode disposed with respect to one another such that current flow from the AC voltage source through the third and fourth electrodes creates a wave retarding effect in the second region of the waveguide core.

24. The circular polarization light modulator of claim 23 further comprising the waveguide core having a generally rectangular cross section.

25. The circular polarization light modulator of claim 24 further comprising the waveguide core having a generally square cross section.

26. The circular polarization light modulator of claim 23 further comprising the third region of the waveguide operable to approximately match at least two modes of light passing through the waveguide.

27. The circular polarization light modulator of claim 23 further comprising the third region of the waveguide core formed from unpoled EO polymer.

* * * * *